(12) United States Patent
Beshinski

(10) Patent No.: US 11,991,341 B2
(45) Date of Patent: *May 21, 2024

(54) TIME-OF-FLIGHT IMAGE SENSOR RESOLUTION ENHANCEMENT AND INCREASED DATA ROBUSTNESS USING A BINNING MODULE

(71) Applicant: Infineon Technologies AG, Neubiberg (DE)

(72) Inventor: Krum Beshinski, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,188

(22) Filed: Dec. 8, 2022

(65) Prior Publication Data
US 2023/0108515 A1  Apr. 6, 2023

Related U.S. Application Data

(63) Continuation of application No. 16/449,665, filed on Jun. 24, 2019, now Pat. No. 11,570,424.

(51) Int. Cl.
*H04N 13/254* (2018.01)
*G01S 17/894* (2020.01)
(Continued)

(52) U.S. Cl.
CPC ......... *H04N 13/254* (2018.05); *G01S 17/894* (2020.01); *H04N 13/271* (2018.05);
(Continued)

(58) Field of Classification Search
CPC .... H04N 13/254; H04N 13/271; H04N 25/46; H04N 25/70; H04N 25/75; G01S 17/894;
(Continued)

(56) References Cited

U.S. PATENT DOCUMENTS

| 5,093,721 A | 3/1992 | Rabii |
| 6,847,397 B1 | 1/2005 | Osada |

(Continued)

FOREIGN PATENT DOCUMENTS

| CN | 106412407 A | 2/2017 |
| CN | 107636488 A | 1/2018 |
| KR | 100707071 B1 | 4/2007 |

*Primary Examiner* — Jennifer D Bennett
*Assistant Examiner* — Erin R Garber
(74) *Attorney, Agent, or Firm* — Harrity & Harrity, LLP

(57) ABSTRACT

A time-of-flight (ToF) image sensor system includes a pixel array, where each pixel of the pixel array is configured to receive a reflected modulated light signal and to demodulate the reflected modulated light signal to generate an electrical signal; a plurality of analog-to-digital converters (ADCs), where each ADC is coupled to at least one assigned pixel of the pixel array and is configured to convert a corresponding electrical signal generated by the at least one assigned pixel into an actual pixel value; and a binning circuit coupled to the plurality of ADCs and configured to generate at least one interpolated pixel, where the binning circuit is configured to generate each of the at least one interpolated pixel based on actual pixel values corresponding to a different pair of adjacent pixels of the pixel array, each of the at least one interpolated pixel having a virtual pixel value.

24 Claims, 6 Drawing Sheets

(51) Int. Cl.
  *H04N 13/271* (2018.01)
  *H04N 25/46* (2023.01)
  *H04N 25/70* (2023.01)
  *H04N 25/75* (2023.01)
  *G01S 7/4914* (2020.01)
  *G01S 7/493* (2006.01)
  *G01S 17/36* (2006.01)
  *G01S 17/48* (2006.01)

(52) U.S. Cl.
  CPC ............. *H04N 25/46* (2023.01); *H04N 25/70* (2023.01); *H04N 25/75* (2023.01); *G01S 7/4914* (2013.01); *G01S 7/493* (2013.01); *G01S 17/36* (2013.01); *G01S 17/48* (2013.01)

(58) Field of Classification Search
  CPC ........ G01S 7/4914; G01S 7/493; G01S 17/36; G01S 17/48
  See application file for complete search history.

(56) References Cited

U.S. PATENT DOCUMENTS

| | | | |
|---|---|---|---|
| 7,379,105 | B1 | 5/2008 | Frank et al. |
| 9,906,717 | B1* | 2/2018 | Plank ................ G06T 7/13 |
| 9,971,023 | B2 | 5/2018 | Dielacher et al. |
| 10,054,673 | B2 | 8/2018 | Cardei |
| 10,531,019 | B2 | 1/2020 | Tang |
| 2004/0131151 | A1 | 7/2004 | Berman et al. |
| 2011/0129123 | A1 | 6/2011 | Ovsiannikov et al. |
| 2013/0112753 | A1 | 5/2013 | Wang |
| 2018/0081043 | A1 | 3/2018 | Demirtas et al. |
| 2018/0146154 | A1 | 5/2018 | Sato et al. |
| 2018/0283950 | A1 | 10/2018 | Ge et al. |
| 2018/0295297 | A1 | 10/2018 | Kim et al. |
| 2019/0293792 | A1 | 9/2019 | Keel et al. |
| 2020/0013811 | A1* | 1/2020 | Jin ................ H01L 27/14812 |
| 2020/0404246 | A1 | 12/2020 | Beshinski |

* cited by examiner

TIME-OF-FLIGHT IMAGE SENSOR RESOLUTION ENHANCEMENT AND INCREASED DATA ROBUSTNESS USING A BINNING MODULE

RELATED APPLICATION

This application is a continuation of U.S. patent application Ser. No. 16/449,665, filed Jun. 24, 2019, which is incorporated herein by reference in its entirety.

FIELD

The present disclosure relates generally to time-of-flight image sensors, and, more particularly, to a pixel interpolation utilized by the time-of-flight image sensors.

BACKGROUND

Time-of-Flight (ToF) cameras deliver a point cloud with distance information in every pixel and addresses multiple applications in the consumer, industrial, and automotive markets. ToF cameras typically feature large pixels, which limits the achievable practical resolution. Many applications are requesting increased resolution from the ToF image sensors, combined with increased requirements towards the data robustness and smaller form factor. Those requirements are contradictory and require compromise.

Therefore, an improved ToF image sensor having increased resolution and/or reduced noise may be desirable.

SUMMARY

One or more embodiments provide a time-of-flight (ToF) image sensor system that includes an illumination source configured to generate a modulated light signal; a pixel array including a plurality of actual pixel lines and a plurality of actual pixel columns, wherein each pixel of the pixel array is configured to receive the modulated light signal reflected from an object as a reflected modulated light signal and to demodulate the reflected modulated light signal to generate an electrical signal; a plurality of analog-to-digital converters (ADCs), wherein each ADC is coupled to at least one assigned pixel of the pixel array and is configured to convert a corresponding electrical signal generated by the at least one assigned pixel into an actual pixel value; a binning circuit coupled to the plurality of ADCs and configured to generate at least one interpolated pixel, wherein the binning circuit is configured to generate each of the at least one interpolated pixel based on actual pixel values corresponding to a different pair of adjacent pixels of the pixel array, each of the at least one interpolated pixel having a virtual pixel value; and an output circuit coupled to the binning circuit and configured to output the virtual pixel value of each of the at least one interpolated pixel according to an image structure.

One or more embodiments further provide a method of pixel interpolation in a time-of-flight (ToF) image sensor system, the method includes generating a modulated light signal; generating a plurality of electrical signals based on pixels of a pixel array receiving the modulated light signal reflected from an object as a reflected modulated light signal; converting the plurality of electrical signals into a plurality of actual pixel values, wherein each actual pixel value of the plurality of actual pixel values corresponds to at least one pixel of the pixel array; generating at least one interpolated pixel including generating each of the at least one interpolated pixel based on actual pixel values corresponding to a different pair of adjacent pixels of the pixel array, each of the at least one interpolated pixel having a virtual pixel value; and outputting the virtual pixel value of each of the at least one interpolated pixel according to an image structure.

BRIEF DESCRIPTION OF THE DRAWINGS

Embodiments are described herein making reference to the appended drawings.

DETAILED DESCRIPTION

Figure 1:
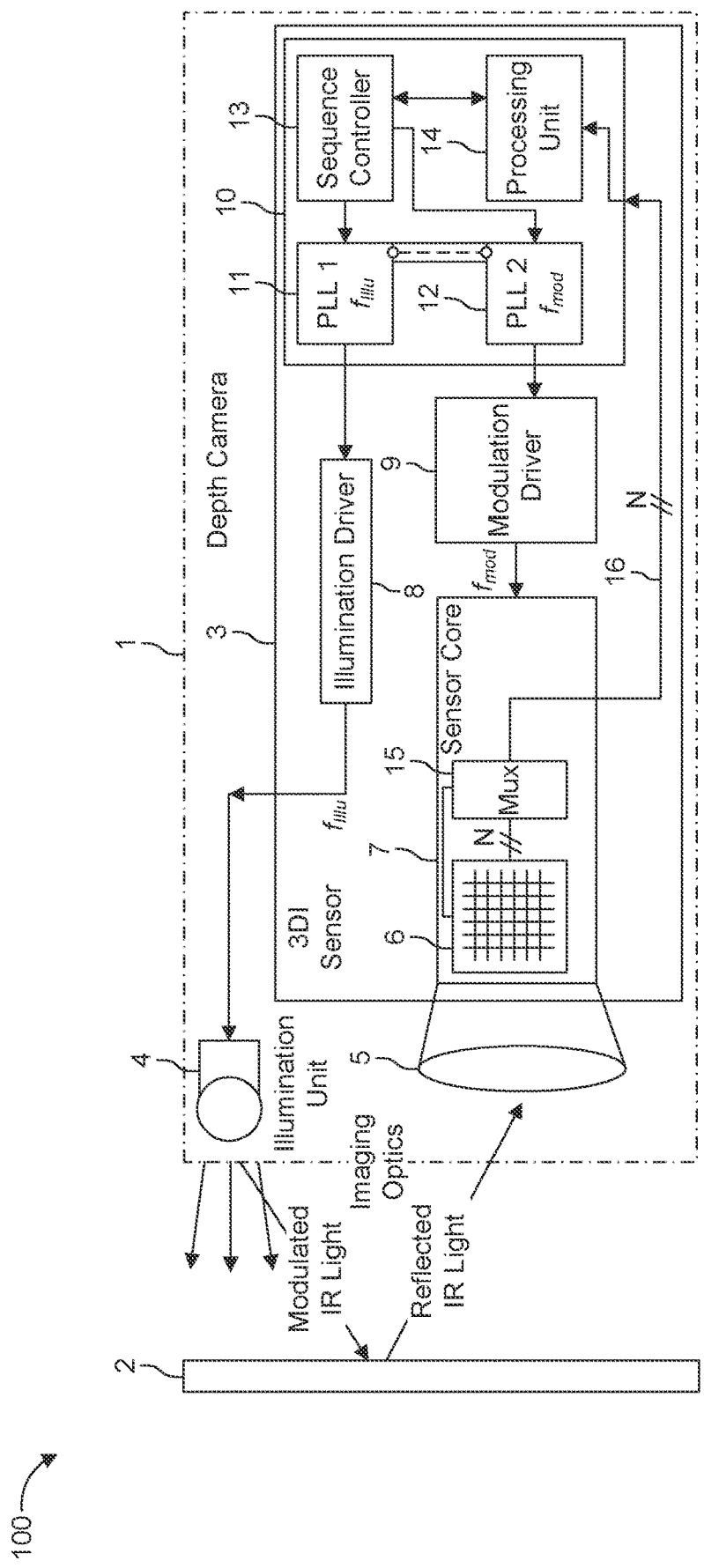
FIG. 1 is a schematic block diagram of a three-dimensional (3D) depth camera system according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

More specifically, the embodiments related to a three-dimensional (3D) image sensor configured to determine a depth (i.e., a distance) from a depth camera, or more specifically from a pixel array, to an object using a time-of-flight (ToF) principle. In general, light is transmitted from the depth camera and is reflected back by the object. The reflected light is received by a pixel array, where, on a pixel-by-pixel basis, the reflected light is demodulated during an image acquisition to generate a measurement signal. Each pixel may be also configured to perform multiple image acquisitions at different acquisition times, and thereby generate multiple measurement signals therefrom.

Indirect time-of-flight (ToF) three-dimensional image (3DI) sensors are based on continuously modulated light for scene illumination, and demodulation of the received light on a pixel level during integration phases. In particular, continuous wave modulation uses continuous light waves instead of short light pulses and the modulation is done in terms of frequency of sinusoidal waves. For continuous wave modulation, a detected wave after reflection has a shifted phase, and the phase shift is proportional to distance from reflecting object or surface. Thus, the distance can be determined from the measured phase shift. Depth information is obtained by a calculation of pixel values from several image acquisitions with pre-defined and constant phase steps between light emission and pixel modulation. For example, four depth images may be used with discrete (congruent) phase differences of 0°/90°/180°/270° to estimate the depth value for each pixel. This is in contrast to pulsed modulation, in which a system measures distance to a 3D object by measuring the absolute time a light pulse takes to travel from a source into the 3D scene and back, after reflection.

While specific embodiments may be described in the context of continuation wave ToF systems (i.e., indirect ToF systems), the concepts described herein may also be extended to direct ToF systems, such as Light Detection and Ranging (LIDAR) systems. LIDAR systems used pulsed modulation for measuring ToF and taking distance measurements. In particular, in LIDAR, a light source transmits light pulses into a field of view and the light reflects from one or more objects by backscattering. Thus, LIDAR is a direct ToF system in which the light pulses (e.g., laser beams of infrared light) are emitted into the field of view, and a pixel array detects and measures the reflected beams. For example, an array of photodetectors receives reflections from objects illuminated by the light.

In LIDAR, differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance. In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged.

In one example, for each distance sampling, a microcontroller triggers a laser pulse from a light source and also starts a timer in a Time-to-Digital Converter (TDC) Integrated Circuit (IC). The laser pulse is propagated through transmission optics, reflected by the target field, and captured by one or more receiving photodiodes of the photodetector array. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by a scanning mirror, an area (i.e., a field of view) can be scanned, a three-dimensional image can be generated, and objects within the area can be detected.

The signal processing chain of the receiver may also include an ADC for each photodiode or for a group of photodiodes. An ADC is configured to convert the analog electrical signals from the photodiodes or group of photodiodes into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

FIG. 1 is a schematic block diagram of a three-dimensional (3D) depth camera system 100 according to one or more embodiments. The 3D depth camera system 100 includes a 3D depth camera 1 and an object 2. The object 2 may be one or more objects that make up a 3D scene for imaging. The 3D depth camera system 100 uses a ToF-based 3DI sensor concept, using indirect depth measurement with continuously modulated illumination signals sourcing an illumination unit, and a modulated sensor core, where on pixel-basis received light is demodulated by a pixel modulation signal.

The 3D depth camera 1 is an image sensor that includes a sensor chip 3 comprising various components for performing depth measurement, an illumination unit 4, and imaging optics 5 (e.g., a lens). The illumination unit 4 may be an illumination source such as a such as a light emitting diode (LED) or a vertical-cavity surface-emitting laser (VCSEL) configured to emit a modulated light signal (e.g., modulated IR light), or any other suitable light source configured to emit a modulated illumination signal (e.g., modulated IR light or light signal). The illumination unit 4 may be configured to emit the modulated IR light towards the object 2, and the imaging optics 5 (e.g., a lens) may be configured to receive reflected modulated IR light that is reflected from the surface of the object 2. It will be appreciated that the terms "light signal", "IR light", and "illumination signal" may be used interchangeably herein.

The illumination unit 4 may be further configured to emit the modulated IR light towards the object 2 using illumination optics (e.g., a lens or a diffractive optical element (DOE)). Thus, using the illumination optics, the illumination unit 4 may illuminate only a field of view (FOV) of the image sensor 1.

The imaging optics 5, which may be an imaging lens system or objective including one or more lenses or DOEs, is configured to receive reflected IR light that is reflected from object 2 (i.e., objects of a 3D scene). The reflected light is directed by the imaging optics 5 at a pixel array 6 of a sensor core 7.

The sensor chip 3 includes the sensor core 7, which includes pixel array 6, an illumination driver 8, a modulation driver 9, and a control unit 10. The control unit includes two phase lock loop (PLL) circuits 11 and 12, a sequence controller 13, and a processing unit 14 that includes a binning module that is configured to increase the resolution of a resulting image by using pixel interpolation. The binning module is a circuit comprising entirely of hardware (e.g., logic circuitry) with no software or program code implemented by a processor being involved.

A plurality of N readout channels 16 is used to couple the processing unit 14 to the pixel array 6 in order to read out electrical signals generated by the pixels. The sensor core 7 includes a multiplexer 15 that couples a pixel or a group of pixels of the pixel array to a corresponding readout channel that is assigned thereto. The sequence controller 13 is configured to change the pixel assignments to the readout channels 16 so that different pixels can be read out at different times by different readout channels 16. This helps to reduce the complexity of the readout circuit needed to readout the full pixel array. Each readout channel is coupled to a corresponding ADC at the processing unit 14, where each ADC is configured to receive electrical signals from the pixel or group of pixels that is coupled to the assigned readout channel.

The PLL circuits 11 and 12, together, may form a modulator to modulate one or more driver signals. A first PLL 11 may be configured to control a modulation signal $f_{Illu}$ via the illumination driver 8 and a second PLL 12 may be configured control a modulation signal $f_{mod}$ via the modulation driver 9. Thus, under control of the first PLL 11, the illumination driver 8 is configured to generate the illumination modulation signal $f_{Illu}$ having a first modulation frequency. Similarly, under control of the second PLL 12, the modulation driver 9 is configured to generate the sensor core (pixel) modulation signal $f_{mod}$ having a second modulation frequency. The PLLs 11 and 12 are configured such that the first and the second modulation frequencies may have a predetermined frequency difference greater than zero for at least a portion of the image acquisition time for each of the image acquisitions.

Thus, the 3D depth camera 1 is configured to emit modulated IR light and measure the time the IR signal takes to travel from the depth camera 1 to the 3D scene 2 and back again. The elapsed time, referred to as a "time-of-flight," enables the 3D depth camera 1 to generate raw image data on a pixel-by-pixel basis and output the raw image data to the processing unit 14. In particular, the 3D depth camera 1 may be a continuous modulation ToF camera that measures the time-of-flight by using or determining a phase difference between the reflected modulated light and the modulation signal $f_{mod}$. For example, a phase difference can be translated to a distance based on the known frequency difference and an image acquisition time. Thus, a depth (distance) to the object can be determined from the phase difference information determined upon receipt of the reflected modulated light.

As will be described in more detail below, the predetermined frequency difference may be set to be greater than zero for all or part of an integration time, all or part of a waiting time, or for all or part of an image acquisition time for each of a multiple image acquisitions taken at different image acquisition times. At other times, the frequencies of the modulation signals $f_{mod}$ and film may be equal such that there is no frequency difference therebetween.

During depth measurement, the illumination driver 8 may be configured to receive a control signal from the first PLL 11, and output the modulation signal $f_{Illu}$ to the illumination unit 4 according to the control signal. The illumination unit 4 then generates a modulated light signal based on the illumination modulation signal $f_{Illu}$.

During depth measurement, the modulation driver 9 may be configured to receive a control signal from the second PLL 12, and output the sensor core modulation signal $f_{mod}$ to a pixel array 6 of a sensor core 7 according to the control signal. While not shown, the modulation driver 9 may generate a plurality of modulation signals $f_{mod}$ that are received by the sensor core 7, each with a same modulation frequency and phase, to control the modulation frequency of the ToF pixels of the pixel array 6. Thus, when modulation signal $f_{mod}$ is referenced herein, it will be understood that this may include one or more signals with the same modulation frequency and phase for modulating the pixels of the pixel array 6.

The pixel array 6 may be a 224×172 pixel matrix, but is not limited thereto. The pixel array 6 may be configured to receive the reflected IR signal from the imaging optics 5 and demodulate the reflected IR signal using the modulation signal $f_{mod}$ such that a phase difference (i.e., phase shift) between the modulated (reflected) illumination signal and the modulated pixel array 6 (e.g., signal $f_{mod}$) may be detected and measured. In particular, the pixel array 6 may be configured to directly demodulate the reflected light.

Said differently, the sensor core 7 includes the pixel array 6 modulated by the pixel modulation signal $f_{mod}$, and a pixel of the pixel array 6 is configured to receive the modulated light signal reflected from object 2 as a reflected modulated light signal. The pixel of the pixel array 6 is further configured to demodulate the reflected modulated light signal using the pixel modulation signal $f_{mod}$ during an image acquisition to generate a measurement signal. The pixel is configured to generate a plurality of measurement signals based on a plurality of image acquisitions taken at different image acquisition times. Each pixel or a subset of pixels of the pixel array 6 may perform a similar process.

The processing unit 14 may be configured to receive the plurality of measurement signals from each pixel (e.g., a plurality of measurement signals from each pixel) and calculate the depth of the object 2 on a pixel-by-pixel basis based on the plurality of measurement signals using phase difference information embedded in each measurement signal. In particular, the processing unit 14 may calculate an absolute phase difference based on the phase difference values associated with the measurement signals for each pixel, and translate the absolute phase difference into depth (distance) information. Thus, a 3D image of the object 2 can be generated, output, and/or displayed.

The sequence controller 13 may include one or more processors and a clock source, and may be configured to control each of the PLLs 11 and 12. That is, the sequence controller 13 may be configured to control the modulation frequencies implemented by the PLLs 11 and 12 for controlling the two modulation signals $f_{mod}$ and $f_{Illu}$ and the frequency difference therebetween. The sequence controller 13 may be an internal controller logic with which the processing unit 14 can communicate with or through which the processing unit 14 may parametrize the depth camera 1 in order to control one or more of the pixel modulation and illumination modulation frequencies of $f_{mod}$ and $f_{Illu}$, respectively, the duration and timing of introducing the frequency difference during each image acquisition provided by the PLLs 11 and 12, or the definition of an image sequence having defined frame rate.

The first PLL circuit 11 and the second PLL circuit 12 may be coupled to each other such that they share a common clock source (e.g., provided by the sequence controller 13). Thus, the two frequencies of the illumination modulation signal $f_{Illu}$ and the pixel modulation signal $f_{mod}$ are coupled to each other and can be derived from the same clock frequency. This allows for the frequency difference between the two frequencies to be constant and precise based on a desired frequency difference. In the event the frequency difference is greater than zero, it can be ensured that the phase difference between the modulation signals $f_{mod}$ and $f_{Illu}$ grows continuously and linearly over time in a consistent and expected manner. In the event that there is no frequency difference, it can be ensured that the phase difference between the modulation signals $f_{mod}$ and $f_{Illu}$ does not change over time and remains constant.

Thus, these two PLLs 11 and 12 may be programmed by the sequence controller 13 such that they differ slightly in frequency (e.g., a frequency difference 1 Hz or 0.1 Hz for modulation frequency of 80 MHz for example). A synchronous start of the two PLLs 11 and 12 for sensor pixel modulation and illumination signal modulation can be achieved to start at phase difference of 0°, with a constant and continuously growing phase difference between the two modulation signals $f_{Illu}$ and $f_{mod}$ for at least part of an image acquisition time. That is, the frequency difference between the two modulation signals $f_{Illu}$ and $f_{mod}$ introduces a linear phase shift growing linearly with time. In principal, also a phase differences of greater than 360° can be used (phase ambiguity). By programming a certain frame rate, integration time, and waiting time, for example, by the processing unit 14, arbitrary but very precise and easily calculated phase differences can be chosen or determined for depth measurement.

The phase difference may also set by the sequence controller 13 to be constant for at least part of an image acquisition by setting the frequency of the illumination modulation signal $f_{Illu}$ to be the same as the frequency of the pixel modulation signal $f_{mod}$. In this case, the frequency difference is equal to zero (i.e., there is no frequency difference) and the phase difference between the modulation signals $f_{mod}$ and $f_{Illu}$ does not change over time.

This programing of the set frequency difference allows a precisely controllable and, if wanted, continuously changeable phase difference between pixel modulation signal $f_{mod}$ and the illumination modulation signal $f_{Illu}$ for the 3DI sensor. At other times, there may be no frequency difference, which provides a constant, unchanging phase difference for a certain period of time during an image acquisition time.

It will be appreciated that, while the use of two PLLs are described, other equivalent structures are also possible. For example, structures with a combined PLL or modulator structure may be implemented where the two different frequencies can be obtained. For example, a combined PLL structure may be implemented where the two different frequencies of the modulation signals $f_{mod}$ and $f_{Illu}$ are obtained. For example, the combined PLL structure may be a dedicated PLL circuit enabling output of two stable signals with coupled frequencies.

Additional embodiments herein are directed to using the binning module of the sensor chip 3 (i.e., of the image sensor 1) to increase the resolution of the resulting image by using pixel interpolation, and is applicable independent of the initial image sensor resolution defined by the pixel array 6.

By using the binning module consisting only of hardware to perform the pixel interpolation, and thereby produce interpolated pixels (i.e., virtual pixels), the following advantages may be realized. First, the computational load on the application processor may be reduced and the memory requirements may be relaxed. Second, the pixels resulting from the binning operation can be regarded as a single pixel with the area equal to the combined areas of the binned pixel. This means that the binned pixels offer much better sensitivity and lower noise, which in turn provides a sub-image with improved dynamic range and lower noise. This sub-image can be used as a reference image for making pixel validity/confidence decisions for the composing pixels in post processing. The net result would be increasing the resolution (up to 3 times) of the raw data, with the added benefit of an embedded image with higher confidence and improved signal-to-noise ratio (SNR).

Figure 2A:
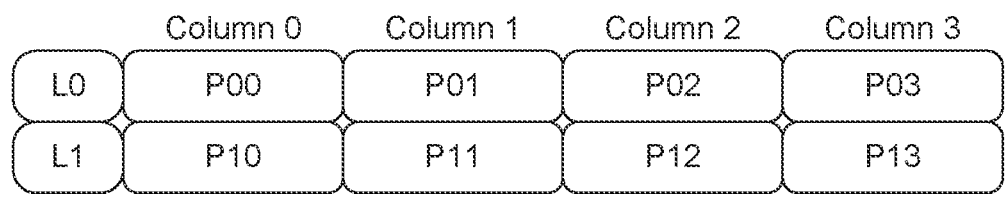
FIGS. 2A-2D illustrate a pixel interpolation method according to one or more embodiments.

FIGS. 2A-2D illustrate a pixel interpolation method according to one or more embodiments. In particular, FIG. 2A illustrates a 2×4 pixel array 200 comprising two pixel lines L0 and L1, also referred to a pixel rows, and N pixel columns, where N is equal to four in this example. Each pixel P is identified in a matrix format representative of its pixel line and pixel row. The pixel array 200 is representative of a simplified version of pixel array 6. Thus, each pixel P is an "actual", "real", or "physical" pixel configured to detect light and generate an electrical signal in response thereto.

Binning in a "1×2 way" corresponds to averaging two adjacent pixels, real or virtual, located in a same pixel line but in different pixel columns. In contrast, binning in a "2×1 way" corresponds to averaging two adjacent pixels, real or virtual, located in a same pixel column but in different pixel lines.

Figure 2B:
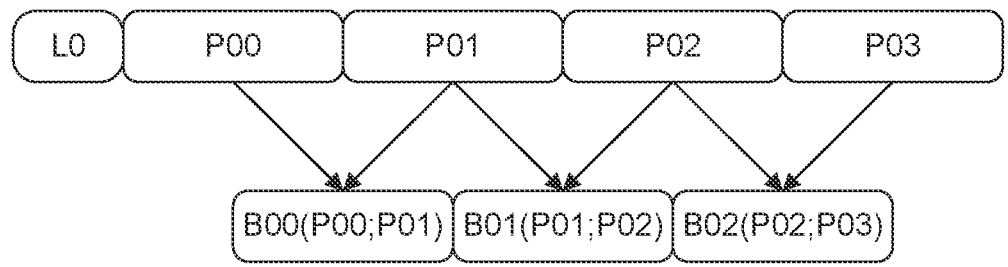
Figure 2B:
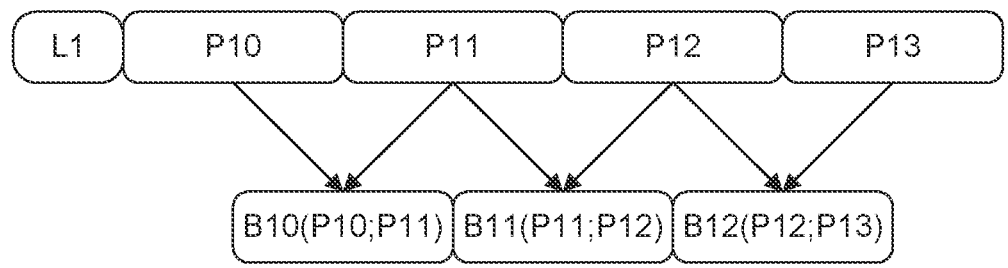

As shown in FIG. 2B, the binning module is configured to bin the pixels of the first line L0 in a 1×2 way, producing one binned pixel B for every two actual pixels. The binned pixels B may also be referred to as virtual pixels. The binned pixels B are then inserted in between its parent pixels (i.e., those pixels used to generate the binned pixel data). Thus, binned pixel B00 is inserted between its parent pixels P00 and P01 in an image line of an image structure. This leads to a new line length of 2Npix−1 pixels, where N is the number of columns of the pixel array 200. In this case, the new line length of lines L0' and L1' is seven.

To generate the binned pixels B, the binning module is configured to add the pixel data (e.g., pixel values) of two adjacent pixels P, calculate average data (e.g., an average value) of from the sum, and store the average data as binned pixel data (e.g., a binned pixel value) of a binned pixel B. In this case, pixels P00 and P01 are binned (i.e., added and averaged) to derive binned pixel data for binned pixel B00; pixels P01 and P02 are binned (i.e., added and averaged) to derive binned pixel data for binned pixel B01; and pixels P02 and P03 are binned (i.e., added and averaged) to derive binned pixel data for binned pixel B02. The same procedure is repeated for the pixels in line L01 to produce binned pixels B10, B11, and B12. Thus, each new line of pixels L0' and L1' includes an arrangement of interleaved actual pixel data and binned pixel data (e.g., interleaved actual pixel values and binned pixel values). As a result, the new line of pixels L0' and L1' may be referred to as interleaved pixel lines, and the pixel array can be said to include virtual pixel columns.

Figure 2C:
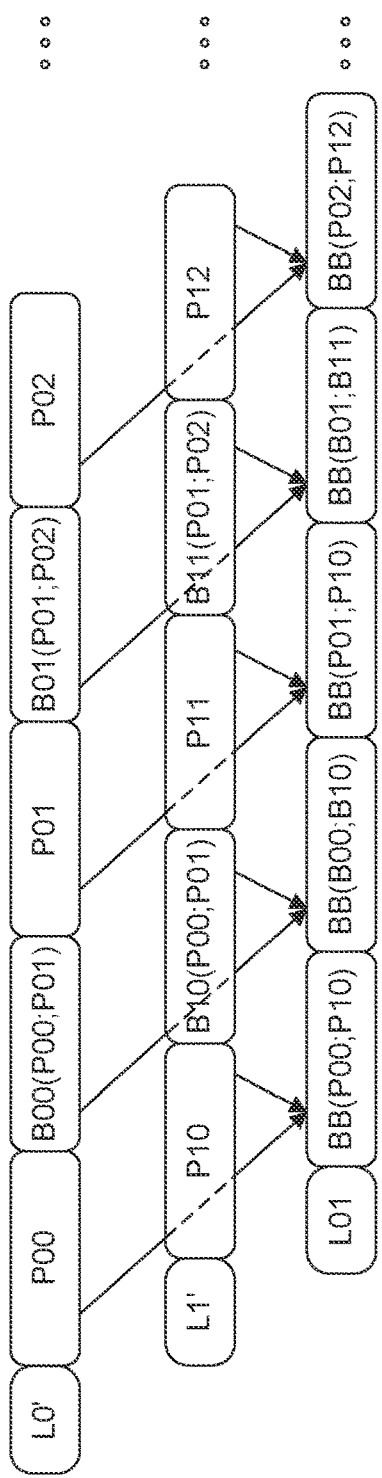

The next step, illustrated in FIG. 2C, is for the binning module to perform the same operation, but on the pixels between the two new lines in a 2×1 way, forming a third line L01, which consist only of averaged pixels (i.e., of binned pixels BB). In other words, the averaging operation is performed on adjacent pixels in the same pixel column, including the virtual pixel columns interposed between real pixel columns.

In particular, the first pixels of new lines L0' and L1' are averaged together to generate a binned pixel BB(P00;P01); the second pixels of new lines L0' and L1' are averaged together to generate a binned pixel BB(B00;B10); the third pixels of new lines L0' and L1' are averaged together to generate a binned pixel BB(P01;P10); the fourth pixels of new lines L0' and L1' are averaged together to generate a binned pixel BB(B01;B11); the fifth pixels of new lines L0' and L1' are averaged together to generate a binned pixel BB(P02;P12); and so on. As a result, a new line L01 (i.e., a virtual pixel line) is created having line length of 2Npix−1 pixels.

Figure 2D:
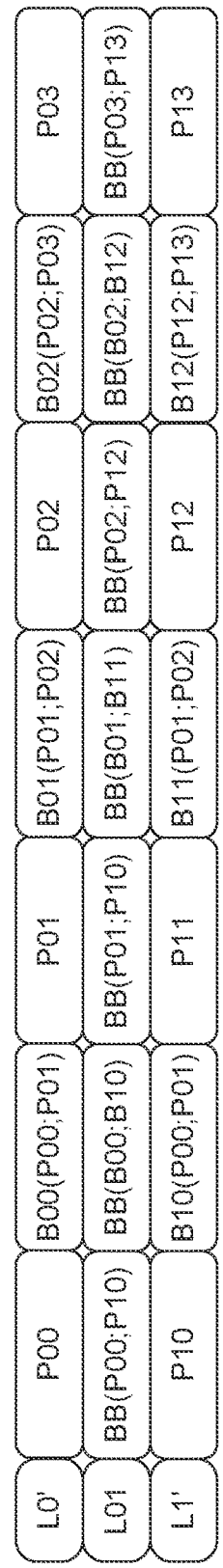

FIG. 2D illustrates a pixel structure of a final image 201 as a result of the pixel interpolation performed by the binning module. In particular, the virtual pixel line L01 is inserted in an image structure or memory structure between interleaved pixel lines L0' and L1'.

Figure 3:
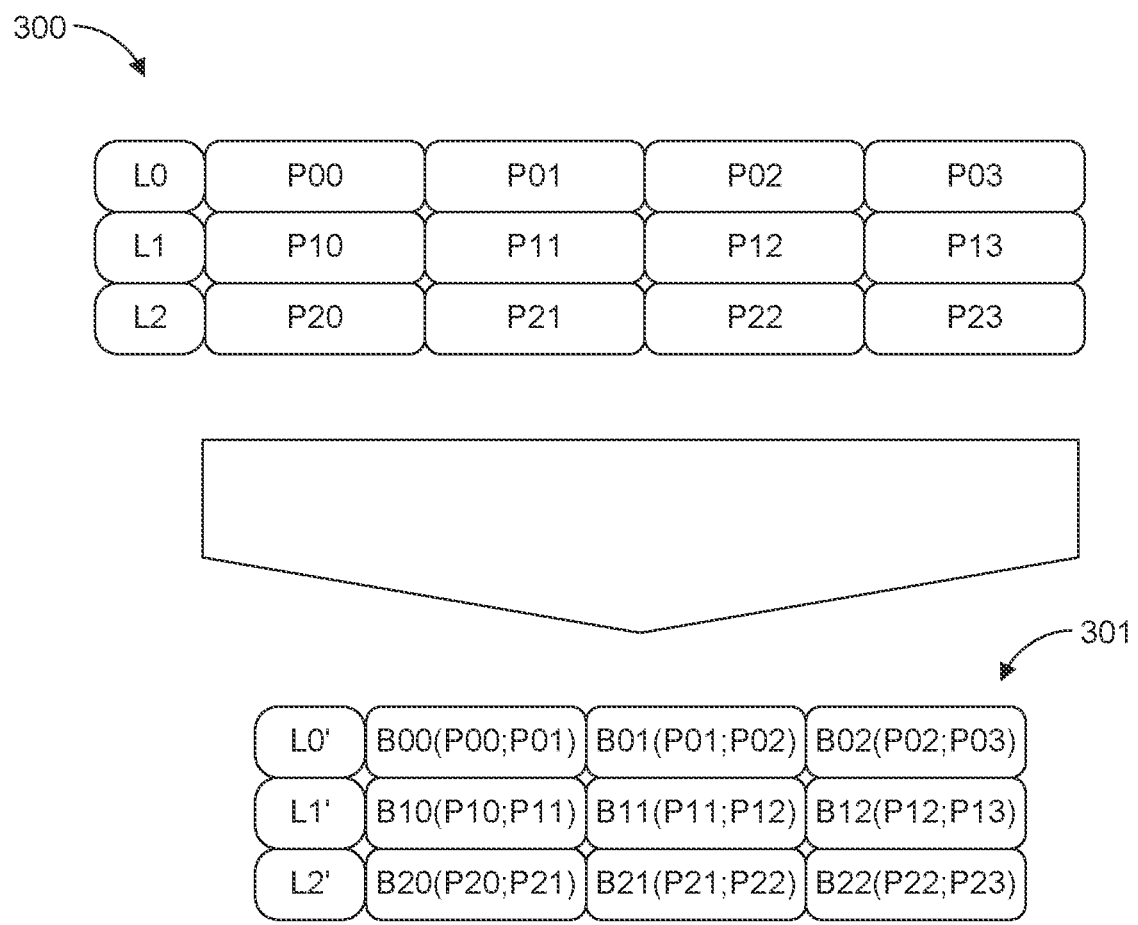
FIG. 3 illustrates a pixel interpolation method according to one or more embodiments.

FIG. 3 illustrates a pixel interpolation method according to one or more embodiments. In particular, a pixel array 300 representative of a simplified version of pixel array 6 and including three pixel lines L0, L1, and L2 and N pixel columns, where N is equal to four in this example. Much like the process described in conjunction with FIG. 2B, each pixel line is used to generate a virtual line of binned pixels. However, instead of inserting the binned pixels in between their parent pixels, as was the case in FIG. 2C, each new virtual line of binned pixels is used to replace their respective parent pixel lines in the image structure 301. Thus, virtual pixel line L0' replaces pixel line L0 in the image structure, virtual pixel line L1' replaces pixel line L1 in the image structure, and virtual pixel line L2' replaces pixel line L2 in the image structure to generate a final image 301.

The newly assembled pixel lines are output by an output circuit as image lines of the image structure. Thus, the final image structure 301 may be output by the output circuit as image lines that are arranged according to a sequence dictated by the image structure. As one example, a memory controller may be configured to allocate the newly assembled pixel lines to appropriate image lines or memory lines.

In this case, pixel noise may be reduced, thereby improving the SNR. To achieve this, the binning module is configured to perform sliding 2×1 interpolation. As such, the pixels of every line are binned in a 2×1 way, producing one binned pixel for every two real pixels, which results in an image where every pixel, being a binned pixel, has a reduced noise level. Reduced pixel noise would allow for certain reduction in the required illumination power but preserve the performance of the image sensor.

Figure 4:
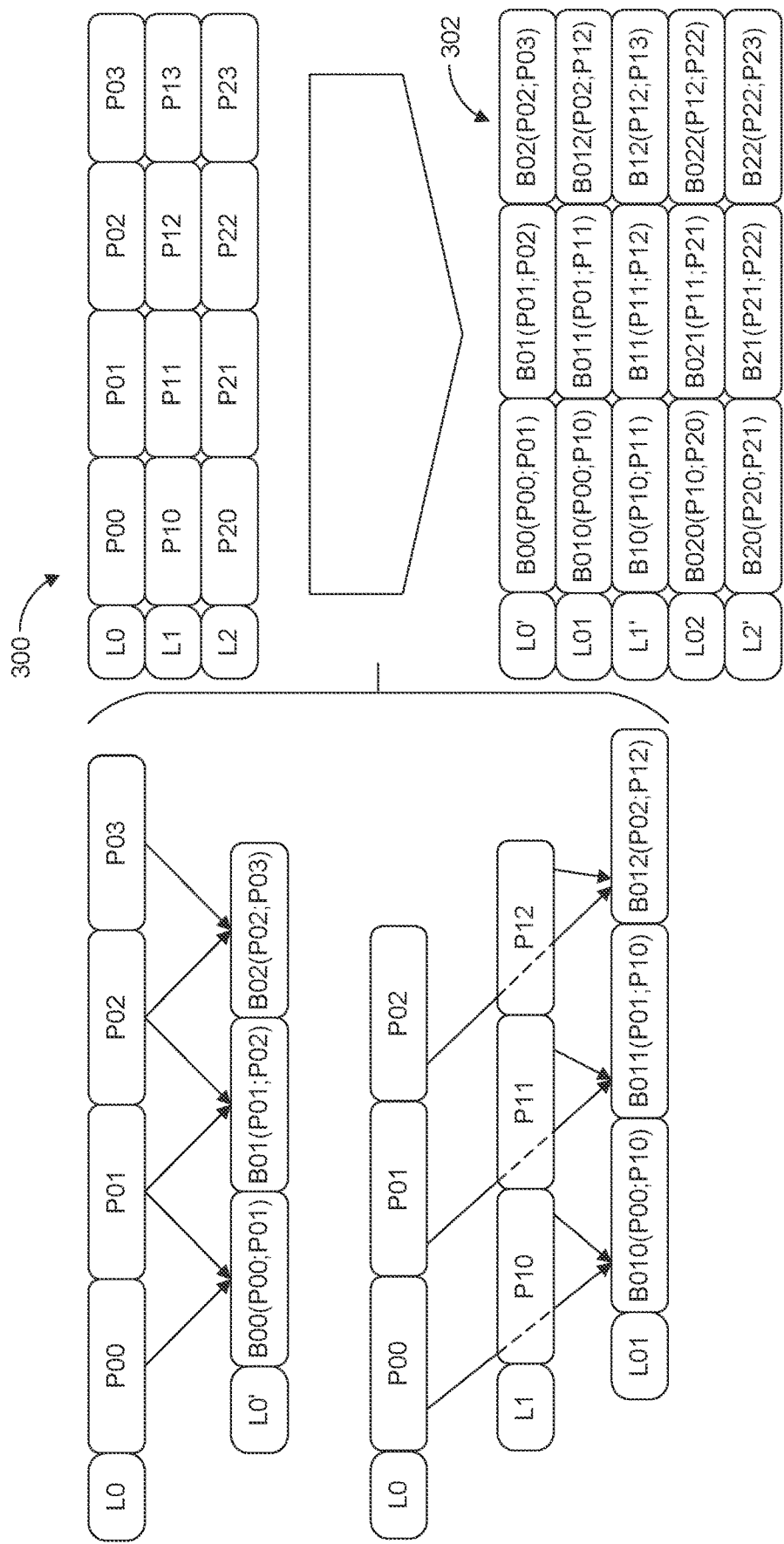
FIG. 4 illustrates a pixel interpolation method according to one or more embodiments in which noise reduction is combined with upscaling the resolution.

The principles of the pixel interpolation method illustrated in FIG. 3 may be extended to include upscaling the resolution. That is, the method illustrated in FIGS. 2A-2D and the method illustrated in FIG. 3 may be combined. FIG. 4 illustrates a pixel interpolation method according to one or more embodiments in which noise reduction is combined with upscaling the resolution.

FIG. 4 illustrates a pixel array 300 representative of a simplified version of pixel array 6 and including three pixel lines L0, L1, and L2 and N pixel columns, where N is equal to four in this example.

Similar to the binning operation illustrated in FIG. 2B in which real pixels of each line L0 and L1 are binned (i.e., averaged) in 1×2 way, each pixel line L0, L1, and L2 of the pixel array 300 are individually used to create new virtual pixel lines L0', L1', and L'2. For example, the binning module is configured to bin the pixels of the first line L0 in a 1×2 way, producing one binned pixel B for every two actual pixels. In this case, pixels P00 and P01 are binned (i.e., added and averaged) to derive binned pixel data for binned pixel B00; pixels P01 and P02 are binned (i.e., added and averaged) to derive binned pixel data for binned pixel B01; and pixels P02 and P03 are binned (i.e., added and averaged) to derive binned pixel data for binned pixel B02. The same procedure is repeated for the pixels in line L01 to produce binned pixels B10, B11, and B12, and for the pixels in line L02 to produce binned pixels B20, B21, and B22. Each new virtual pixel lines L0', L1', and L'2 consists only of averaged pixels (i.e., binned pixels).

In another step, actual pixel lines L0 and L1 are used to create a new virtual pixel line L01, and actual pixel lines L1 and L2 are used to create a new virtual pixel line L02. In other words, each adjacent pair of real pixel lines of the pixel array are used to generate a new virtual pixel line. Here, the averaging operation is performed on adjacent pixels in the same pixel column. Thus, the averaging is performed on the pixels between the two lines in a 2×1 way, forming another pixel line, which consists only of averaged pixels.

The final image structure 302 is assembled by an output circuit configured to assign newly formed pixel lines to appropriate image lines or memory lines according to the final image structure 302. In this case, virtual pixels lines are arranged in the following sequence: L0, L01, L1, L02, and L2 such that the virtual pixel lines formed from a single actual pixel line in a 1×2 way are interleaved with those virtual pixel lines formed from two actual pixel lines in a 2×1 way. Said differently, the virtual pixels lines are arranged in the following sequence: L0, L01, L1, L02, and L2 such that the virtual pixel lines formed from averaging adjacent pixels from a same actual pixel line are interleaved with those virtual pixel lines formed from averaging pixels in adjacent pixel lines. A virtual pixel line generated in the 2×1 way from two parent pixel lines is inserted in an image structure between the virtual pixel lines generated in the 1×2 way from those parent pixel lines.

As a result of combining noise reduction with upscaling the resolution, the SNR may be improved by reducing pixel noise. This is achieved, by the binning module performing a sliding 2×1 interpolation. Adding the possibility to do the same in vertical direction—between pixel lines, also enhances the resolution. As can be seen from the final image structure 302, this requires extra image lines or memory lines to accommodate virtual pixel lines L01, L02, and so forth. This can be enhanced further by doubling the number of ADCs and reading two lines in parallel. The reduced pixel noise would allow for certain reduction in the required illumination power but preserve the performance, and also there is an added benefit from the improved resolution.

Figure 5:
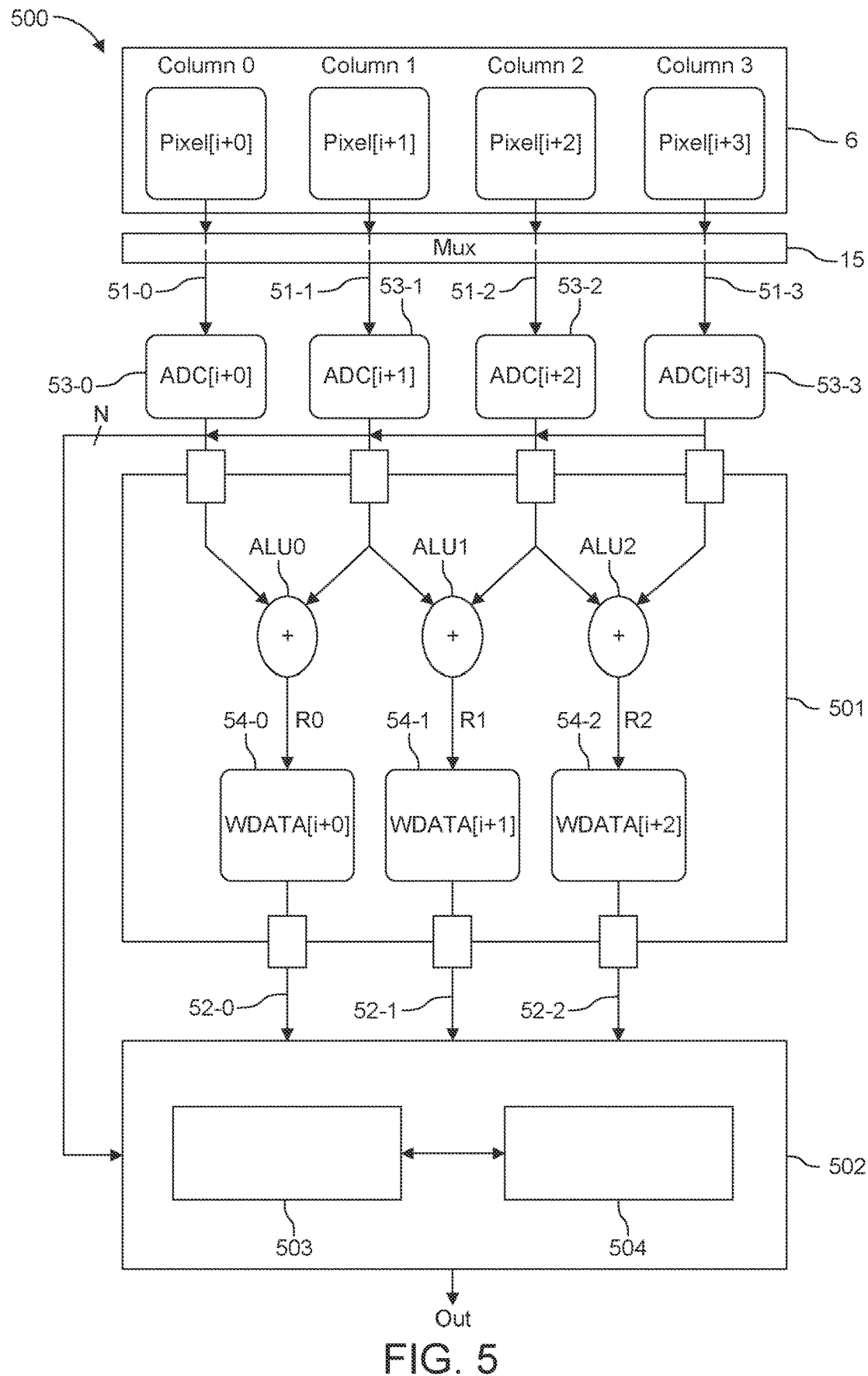
FIG. 5 shows a schematic block diagram of a binning pipeline according to one or more embodiments.

FIG. 5 shows a schematic block diagram of a binning pipeline 500 according to one or more embodiments. The binning pipeline 500 is integrated on the sensor chip 3 of the image sensor 1. The binning pipeline includes pixels of the pixel array 6, a multiplexer 15, readout channels 51-0, 51-1, 51-2, and 51-3, each selectively coupled by the multiplexer 15 to an assigned pixel of the pixel array 6, ADCs 53-0, 53-1, 53-2, or 53-3 that are each coupled to a corresponding readout channel of readout channels 51-0, 51-1, 51-2, and 51-3, a binning module 501, and an output circuit 502 coupled to output channels 52-0, 52-1, and 52-2 of the binning module 501.

The output circuit 502 is configured to receive actual pixel values from the ADCs and virtual pixel values form the binning module 501 and output a total number of pixel values according to an image structure. The image structure may have more pixels than the pixel array 6.

As one example of the output circuit 502, the output circuit 502 may include a memory controller 503 coupled to output channels 52-0, 52-1, and 52-2 of the binning module 501, and an output circuit memory 504 coupled to the memory controller 503. Alternatively, the output circuit 502 may include a first in, first out (FIFO) circuit that receives lines of pixel values and outputs the lines of pixel values as image lines of an image structure on a FIFO basis.

For simplicity, the pixels shown include only a partial pixel line of the pixel array 6. Thus, the pixels include Pixel[i+0], Pixel[i+1], Pixel[i+2], and Pixel[i+3] that are located in row "i" and columns 0-3 of the pixel array 6. Each pixel generates an analog electrical signal (i.e., an analog sensor signal) in response to receiving light and is coupled to a corresponding ADC 53-0, 53-1, 53-2, or 53-3. The ADCs may be part of the binning module 501, or interposed between the pixels and the binning module 501. Each ADC converts a respective analog electrical signal into digital pixel data, which may also be referred to as a digital sensor signal, a digital measurement signal, or actual pixel data.

The output circuit 502 may be configured to receive the digital sensor signals as pixel data (i.e., pixel values) and output the pixel data as image lines of an image structure.

The memory controller 503 may be configured to receive the digital sensor signals as pixel data (i.e., pixel values) and store the pixel data in appropriate memory lines of memory 504 corresponding to an image structure.

The binning module 501 further includes multiple arithmetic logic units (ALUs), each being configured to receive a pair of digital sensor signals from the ADCs, the pair of digital sensor signals in this case corresponding to two adjacent pixels in the same pixel line (e.g., to perform binning in a "1×2 way"). In other embodiments, additional ALUs may be provided that are configured to receive digital sensor signals from a pair of adjacent pixels from the same pixel column (e.g., to perform binning in a "2×1 way"). Thus, in general, each ALU is a digital electronic circuit that comprises averaging logic configured to receive two digital sensor signals corresponding to a pair of adjacent pixels, and generate average (i.e., binned) data as a result of an averaging operation. The pixel data, whether actual or binned, may also be referred to as pixel values.

In this example, ALU0 is configured to receive digital sensor signals corresponding to Pixel[i+0] and Pixel[i+1], and generate binned pixel data as result R0. Similarly, ALU1 is configured to receive digital sensor signals corresponding to Pixel[i+1] and Pixel[i+2], and generate binned pixel data as result R1. ALU2 is configured to receive digital sensor signals corresponding to Pixel[i+2] and Pixel[i+3], and generate binned pixel data as result R32.

The binning module 501 may further includes data buffers 54-0, 54-1, and 54-2 configured to store the results R0, R1, and R2, respectively, as binned data. In particular, data buffer 54-0 stores the binned pixel data of result R0 as WDATA[i+0], data buffer 54-1 stores the binned pixel data of result R1 as WDATA[i+1], and data buffer 54-2 stores the binned pixel data of result R2 as WDATA[i+2]. Thus, the data buffers 54-0, 54-1, and 54-2 are representative of virtual pixels.

The binning module 501 may be further configured to output the binned data WDATA[i+0], WDATA[i+1], and WDATA[i+2] via output channels 52-0, 52-1, and 52-2 to the output circuit 502. The output circuit 502 is configured to receive the binned data and arrange the binned data into image lines according to an image structure. In one example, the memory controller 503 may store the binned data in memory lines of memory 504 corresponding to the image structure.

The binning module 501 may further include another stage of ALUs coupled to at least one of the data buffers 54-0, 54-1, and 54-2 for receiving binned pixel data in order to perform a second stage of averaging operations. For example, in operations shown in conjunction with FIG. 2C, a second stage ALU would be coupled to the data buffer storing binned pixel data B00 and to the data buffer storing binned pixel data B10 in order to generate binned pixel data BB(B00; B10) (i.e., an average of binned pixel data B00 and B10). Additionally, another second stage ALU would be coupled to the data buffer storing binned pixel data B01 and to the data buffer storing binned pixel data B11 in order to generate binned pixel data BB(B01; B11) (i.e., an average of binned pixel data B01 and B11).

Thus, a pair of adjacent pixels to which an ALU is coupled may include two real pixels, two virtual pixels, or a mix of one real pixel and one virtual pixel based on a desired averaging operation, and the ALUs may be arranged in multiple stages in order to achieve the desired resolution and/or noise reduction.

With the final image structure assembled by the output circuit 502, the output circuit 502 may be further configured to read out the image data on an image line-by-image line basis for providing the image data to a processor for further data processing, including object detection, object classification, etc. Similarly, the memory controller 504 may be configured to read out from memory 503 image lines according to memory lines, and output the image data to a processor for further data processing, including object detection, object classification, etc.

In view of the above, two aspects—low resolution binned image and enhanced resolution image—benefit the system in different ways.

The binned image can provide a minimum amount of 3D points in adverse conditions, which can help the system to remain functional even at the cost of decreased performance.

The enhanced resolution of the image can be useful in improving the detection rate of object detection and classification algorithms used by the processing unit 14. Even though the interpolated resolution does not add new data, it can improve the robustness of the existing data and help on algorithm level to make a decision based on the increased pixel number—the increased pixel number can help in object detection and classification, although based on interpolated data.

While the approach could be managed entirely in software, the extra computation load can be very high and increase the latency to unacceptable levels in the product application. In contrast, by using the binning module 501, despite some added latency, there will be no additional increase of the computational load for the system (except for working with larger images).

The interpolation may be a solution to closing the gap to Video Graphics Array (VGA) resolution and may improve object separation due to the enhanced resolution. The concept is to rework the binning module and the memory structure, to enable the imager to generate an interpolated image, which contains the real and the interpolated (virtual) pixels. The binned pixels may also have an advantage of better SNR and dynamic range, so the expectation is that the end result will be an increased number of valid 3D points.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A time-of-flight (ToF) image sensor system, comprising:
   an illumination source configured to generate a modulated light signal;
   a photodetector pixel array comprising a plurality of actual pixel lines and a plurality of actual pixel columns, wherein each pixel of the photodetector pixel array is configured to receive the modulated light signal reflected from an object as a reflected modulated light signal and to demodulate the reflected modulated light signal to generate an electrical signal;
   a plurality of analog-to-digital converters (ADCs), wherein each ADC of the plurality of ADCs is coupled to at least one assigned pixel of the photodetector pixel array and is configured to convert a corresponding electrical signal generated by the at least one assigned pixel into an actual pixel value and output a plurality of actual pixel values;
   a binning circuit coupled to the plurality of ADCs for receiving the plurality of actual pixel values therefrom, wherein the binning circuit is configured to generate at least one interpolated pixel, wherein the binning circuit is configured to generate each interpolated pixel of the at least one interpolated pixel based on actual pixel values of the plurality of actual pixel values corresponding to a plurality of adjacent pixels of the photodetector pixel array, and wherein each interpolated pixel of the at least one interpolated pixel has a virtual pixel value,
   wherein the binning circuit comprises a plurality of arithmetic logic units (ALUs) coupled to the plurality of ADCs,
   wherein each ALU of the plurality of ALUs is coupled to a different group of ADCs of the plurality of ADCs for receiving the actual pixel values therefrom and is configured to combine the actual pixel values to generate a different one of the at least one interpolated pixel; and
   an output circuit coupled to the binning circuit for receiving each virtual pixel value therefrom and configured to output the virtual pixel value of each of the at least one interpolated pixel according to an image structure comprising a plurality of output pixels arranged in an image pixel array.

2. The ToF image sensor system of claim 1, wherein each virtual pixel value is an average of the actual pixel values corresponding to the plurality of adjacent pixels of the photodetector pixel array.

3. The ToF image sensor system of claim 1, wherein:
   the photodetector pixel array includes a first actual pixel line comprising a first plurality of pixels having first actual pixel values, wherein the first plurality of pixels is arranged into a first plurality of adjacent pixel groups, and
   the binning circuit is configured to generate a first plurality of interpolated pixels having first virtual pixel values based on the first actual pixel values of the first plurality of adjacent pixel groups.

4. The ToF image sensor system of claim 3, wherein the output circuit is configured to interleave the first actual pixel values with the first virtual pixel values in an image line of the image structure.

5. The ToF image sensor system of claim 3, wherein:
   the photodetector pixel array includes a second actual pixel line comprising a second plurality of pixels having second actual pixel values, wherein the second plurality of pixels is arranged into a second plurality of adjacent pixel groups, and
   the binning circuit is configured to generate a second plurality of interpolated pixels having second virtual pixel values based on the second actual pixel values of the second plurality of adjacent pixel groups.

6. The ToF image sensor system of claim 5, wherein the output circuit is configured to:
interleave the first actual pixel values with the first virtual pixel values in a first image line of the image structure, and
interleave the second actual pixel values with the second virtual pixel values in a second image line of the image structure.

7. The ToF image sensor system of claim 5, wherein the output circuit is configured to:
output the first virtual pixel values in a first image line of the image structure, and
output the second virtual pixel values in a second image line of the image structure.

8. The ToF image sensor system of claim 7, wherein the image structure includes only virtual pixel values of interpolated pixels.

9. The ToF image sensor system of claim 5, wherein:
the first actual pixel line is adjacent to the second actual pixel line such that the first plurality of pixels is combined with the second plurality of pixels into a third plurality of adjacent pixel groups, and
the binning circuit is configured to generate a third plurality of interpolated pixels having third virtual pixel values, each based on a different one of the first actual pixel values and a different one of the second actual pixel values.

10. The ToF image sensor system of claim 9, wherein the output circuit is configured to:
output the first virtual pixel values in a first image line of the image structure,
store the second virtual pixel values in a second image line of the image structure, and
store the third virtual pixel values in a third image line of the image structure, wherein the third image line is interposed between the first image line and the second image line.

11. The ToF image sensor system of claim 10, wherein the image structure includes only virtual pixel values of interpolated pixels.

12. The ToF image sensor system of claim 9, wherein:
the binning circuit is configured to generate a fourth plurality of interpolated pixels having fourth virtual pixel values, each based on a different one of the first virtual pixel values and a different one of the second virtual pixel values.

13. The ToF image sensor system of claim 12, wherein the output circuit is configured to:
interleave the first actual pixel values with the first virtual pixel values in a first image line of the image structure,
interleave the second actual pixel values with the second virtual pixel values in a second image line of the image structure, and
interleave the third virtual pixel values with the fourth virtual pixel values in a third image line of the image structure.

14. The ToF image sensor system of claim 13, wherein the third image line is interposed between the first image line and the second image line.

15. The ToF image sensor system of claim 14, wherein the image structure includes a plurality of virtual pixel columns each consisting of interpolated pixels.

16. The ToF image sensor system of claim 1, wherein:
the binning circuit is configured to receive, from the plurality of ADCs, a first number of actual pixel values equal to a number of photodetector pixels of the photodetector pixel array, and
the output circuit is configured to output a second number of output pixel values equal to a number of output pixels in the image pixel array, wherein the second number is greater than the first number.

17. The ToF image sensor system of claim 16, wherein the second number of output pixel values include the first number of actual pixel values and a third number of virtual pixel values that includes each virtual pixel value of the at least one interpolated pixel.

18. A time-of-flight (ToF) image sensor system, comprising:
an illumination source configured to generate a modulated light signal;
a photodetector pixel array comprising a plurality of actual pixel lines and a plurality of actual pixel columns, wherein each pixel of the photodetector pixel array is configured to receive the modulated light signal reflected from an object as a reflected modulated light signal and to demodulate the reflected modulated light signal to generate an electrical signal;
a plurality of analog-to-digital converters (ADCs), wherein each ADC of the plurality of ADCs is coupled to at least one assigned pixel of the photodetector pixel array and is configured to convert a corresponding electrical signal generated by the at least one assigned pixel into an actual pixel value and output a plurality of actual pixel values;
a binning circuit coupled to the plurality of ADCs for receiving the plurality of actual pixel values therefrom, wherein the binning circuit is configured to generate at least one interpolated pixel, wherein the binning circuit is configured to generate each interpolated pixel of the at least one interpolated pixel based on actual pixel values of the plurality of actual pixel values corresponding to a different plurality of adjacent pixels of the photodetector pixel array, and wherein each interpolated pixel of the at least one interpolated pixel has a virtual pixel value; and
an output circuit coupled to the binning circuit for receiving each virtual pixel value therefrom and configured to output the virtual pixel value of each interpolated pixel of the at least one interpolated pixel according to an image structure comprising a plurality of output pixels arranged in an image pixel array,
wherein a total number of pixel values in the image pixel array of the image structure is greater than a number of total pixels of the photodetector pixel array.

19. A method of pixel interpolation in a time-of-flight (ToF) image sensor system, the method comprising:
generating a modulated light signal;
generating a plurality of electrical signals based on pixels of a photodetector pixel array receiving the modulated light signal reflected from an object as a reflected modulated light signal;
analog to digitally converting the plurality of electrical signals into a plurality of actual pixel values, wherein each actual pixel value of the plurality of actual pixel values is a digital value that corresponds to at least one pixel of the photodetector pixel array;
subsequent to analog to digitally converting the plurality of electrical signals into the plurality of actual pixel values, generating at least one interpolated pixel including generating each interpolated pixel of the at least one interpolated pixel based on actual pixel values corresponding to a different plurality of adjacent pixels of the photodetector pixel array, wherein each interpolated pixel of the at least one interpolated pixel has a virtual pixel value; and outputting the virtual pixel value of each interpolated pixel of the at least one interpolated pixel according to an image structure comprising a plurality of output pixels arranged in an image pixel array, wherein a total number of pixel values in the image pixel array of the image structure is greater than a number of total pixels of the photodetector pixel.

20. The method of claim 19, wherein the photodetector pixel array includes a first actual pixel line comprising a first plurality of pixels having first actual pixel values, wherein the first plurality of pixels is arranged into a first plurality of adjacent pixel groups, and the method further comprises:

generating a first plurality of interpolated pixels having first virtual pixel values based on the first actual pixel values of the first plurality of adjacent pixel groups.

21. The method of claim 20, wherein the photodetector pixel array includes a second actual pixel line comprising a second plurality of pixels having second actual pixel values, wherein the second plurality of pixels is arranged into a second plurality of adjacent pixel groups, and the method further comprises:

generating a second plurality of interpolated pixels having second virtual pixel values based on the second actual pixel values of the second plurality of adjacent pixel groups.

22. The method of claim 21, further comprising:

interleaving the first actual pixel values with the first virtual pixel values in a first image line of the image structure; and interleaving the second actual pixel values with the second virtual pixel values in a second image line of the image structure.

23. The method of claim 21, further comprising:

outputting the first virtual pixel values in a first image line of the image structure; and outputting the second virtual pixel values in a second image line of the image structure.

24. A time-of-flight (ToF) image sensor system, comprising:

an illumination source configured to generate a modulated light signal;

a pixel array comprising a plurality of actual pixel lines and a plurality of actual pixel columns, wherein each pixel of the pixel array is configured to receive the modulated light signal reflected from an object as a reflected modulated light signal and to demodulate the reflected modulated light signal to generate an electrical signal;

a plurality of analog-to-digital converters (ADCs), wherein each ADC of the plurality of ADCs is coupled to at least one assigned pixel of the pixel array and is configured to convert a corresponding electrical signal generated by the at least one assigned pixel into an actual pixel value;

a binning circuit coupled to the plurality of ADCs and configured to generate at least one interpolated pixel, wherein the binning circuit is configured to generate each interpolated pixel of the at least one interpolated pixel based on actual pixel values corresponding to a different plurality of adjacent pixels of the pixel array, and wherein each interpolated pixel of the at least one interpolated pixel has a virtual pixel value, wherein the binning circuit comprises a plurality of arithmetic logic units (ALUs) coupled to the plurality of ADCs, wherein each ALU of the plurality of ALUs is coupled to a different group of ADCs of the plurality of ADCs for receiving the actual pixel values therefrom and is configured to combine the actual pixel values to generate a different one of the at least one interpolated pixel; and an output circuit coupled to the binning circuit and configured to output the virtual pixel value of each interpolated pixel of the at least one interpolated pixel according to an image structure.

* * * * *